United States Patent
Kim

(10) Patent No.: US 12,515,687 B2
(45) Date of Patent: Jan. 6, 2026

(54) AUTONOMOUS VEHICLE, CONTROL SYSTEM FOR REMOTELY CONTROLLING THE VEHICLE, AND CONTROL METHOD THEREOF

(71) Applicants: HYUNDAI MOTOR COMPANY, Seoul (KR); KIA CORPORATION, Seoul (KR)

(72) Inventor: Dong Hyuk Kim, Hanam-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 214 days.

(21) Appl. No.: 17/986,649

(22) Filed: Nov. 14, 2022

(65) Prior Publication Data

US 2023/0322249 A1   Oct. 12, 2023

(30) Foreign Application Priority Data

Apr. 8, 2022   (KR) .................... 10-2022-0044130

(51) Int. Cl.
*B60W 50/14*   (2020.01)
*B60W 60/00*   (2020.01)
*G05D 1/00*   (2024.01)

(52) U.S. Cl.
CPC ........... *B60W 50/14* (2013.01); *G05D 1/0022* (2013.01); *B60W 2050/146* (2013.01); *B60W 60/005* (2020.02); *B60W 2556/45* (2020.02)

(58) Field of Classification Search
CPC ............... B60W 50/14; B60W 60/005; B60W 2050/146; B60W 2556/45; B60W 60/007; B60W 2050/0005; B60W 2050/0064; B60W 2050/143; B60W 60/0016; G05D 1/0022; G05D 1/0016; B60K 35/00; B60K 35/22; B60K 35/29; B60K 35/10; B60K 35/28; B60R 16/005
See application file for complete search history.

(56) References Cited

U.S. PATENT DOCUMENTS

| | | | |
|---|---|---|---|
| 9,110,468 B2 * | 8/2015 | Funke | G07C 3/00 |
| 10,564,638 B1 * | 2/2020 | Lockwood | G05D 1/00 |
| 11,079,753 B1 * | 8/2021 | Roy | G05D 1/0038 |
| 11,772,717 B1 * | 10/2023 | Ebrahimi Afrouzi | G05D 1/0287 701/23 |
| 2014/0214240 A1 * | 7/2014 | Funke | G05D 1/0291 701/2 |

(Continued)

*Primary Examiner* — Faris S Almatrahi
*Assistant Examiner* — Dana F Artimez
(74) *Attorney, Agent, or Firm* — Lempia Summerfield Katz LLC

(57) ABSTRACT

An autonomous vehicle has a control system and a method thereof remotely controls the vehicle. The control system includes an interface device and a processor. The interface device receives a switch manipulation command by a control manager to control a switch of an autonomous vehicle. The processor activates switch information that is suitable for a vehicle type of the autonomous vehicle on the interface device by using vehicle type information and current switch state information of the autonomous vehicle. The processor displays a current switch state of the autonomous vehicle on the interface device when a remote control request is received from the autonomous vehicle.

16 Claims, 9 Drawing Sheets

(56) References Cited

U.S. PATENT DOCUMENTS

| | | | |
|---|---|---|---|
| 2015/0301528 A1* | 10/2015 | Fredriksson | G05D 1/0016 |
| | | | 701/2 |
| 2018/0111625 A1* | 4/2018 | James | B60W 30/18009 |
| 2018/0319392 A1* | 11/2018 | Posselius | G01S 13/931 |
| 2019/0011910 A1 | 1/2019 | Lockwood et al. | |
| 2019/0155237 A1* | 5/2019 | Kean | G05B 19/0423 |
| 2019/0196465 A1* | 6/2019 | Hummelshøj | B60W 60/0015 |
| 2020/0282980 A1* | 9/2020 | Kinoshita | G05D 1/0027 |
| 2022/0157164 A1* | 5/2022 | Weslosky | G05D 1/0289 |
| 2022/0194414 A1* | 6/2022 | Yu | B60W 10/08 |

* cited by examiner

AUTONOMOUS VEHICLE, CONTROL SYSTEM FOR REMOTELY CONTROLLING THE VEHICLE, AND CONTROL METHOD THEREOF

CROSS-REFERENCE TO RELATED APPLICATION

This application claims priority to and the benefit of Korean Patent Application No. 10-2022-0044130, filed in the Korean Intellectual Property Office on Apr. 8, 2022, the entire contents of which are incorporated herein by reference,

BACKGROUND OF THE DISCLOSURE

(a) Field of the Disclosure

The present disclosure relates to an autonomous vehicle, a control system for remotely controlling the same, and a method thereof. More particularly, the present disclosure relates to a technique for controlling a vehicle switch irrespective of a vehicle type of a target vehicle to be remotely controlled during remote control of an autonomous vehicle.

(b) Description of the Related Art

As electronic vehicle technology develops, interest in autonomous vehicles that drive to a destination by recognizing a driving environment of the vehicle itself without manipulation of a driver is increasingly growing.

An autonomous vehicle refers to a vehicle capable of operating by itself without manipulation of a driver or an occupant.

While driving in an autonomous driving mode, there may be a situation in which it is impossible for the vehicle to follow a driving path to the destination in a normal manner, even though there is no abnormality in a function of the vehicle. As such, when a situation occurs where it is impossible to follow a path during autonomous driving, it is often difficult to follow the driving path, such as when the driver directly intervenes to control the vehicle or when the driver's intervention is difficult to decipher. In this case, in current autonomous systems, the vehicle usually stops.

The above information disclosed in this Background section is only to enhance understanding of the background of the disclosure. Therefore, this Background section may contain information that may not be considered as prior art that is already known to a person of ordinary skill in the art.

SUMMARY OF THE DISCLOSURE

The embodiments of the present disclosure provide an autonomous vehicle, a control system for remotely controlling the same, and a method thereof. In particular, the disclosed embodiments provide an autonomous vehicle, a control system, and a method thereof capable of preventing confusion due to differences in position and operating conditions of switches of various vehicle types. The disclosed embodiments provide a unified operation switch interface to a control manager regardless of a vehicle model of a target vehicle to be remotely controlled during a remote control mode of the target vehicle. The disclosed embodiments further provide an improvement in marketability of autonomous vehicles by preventing accidents caused by erroneous operation of the switches.

The technical objects of the present disclosure are not limited to the objects mentioned above. Other technical objects not mentioned herein may be dearly understood by those of ordinary skill in the art from the description of the claims.

In an embodiment of the present disclosure, a control system includes an interface device configured to receive a switch manipulation command by a control manager to control a switch of an autonomous vehicle. The control system further includes a processor configured to activate switch information that is suitable for a vehicle type of the autonomous vehicle on the interface device by using vehicle type information and current switch state information of the autonomous vehicle. The processor is further configured to display a current switch state of the autonomous vehicle on the interface device when receiving a remote control request from the autonomous vehicle.

In an embodiment of the present disclosure, the control system may further include a storage configured to store switch information for a plurality of vehicle types, including the vehicle type of the autonomous vehicle.

In an embodiment of the present disclosure, the switch information that is suitable for the vehicle type may be configured to include a switch type provided in the vehicle type and a signal type of a switch provided in the vehicle type.

In an embodiment of the present disclosure, the signal type may be configured to include: a first type in which an ON signal is outputted when the switch provided in the vehicle type is pressed once; and a second type in which the ON signal is outputted while the switch provided in the vehicle type is being pressed and an OFF signal is outputted when the switch is released.

In an embodiment of the present disclosure, when a switch manipulation is inputted to the interface device by the control manager, the processor may be configured to generate a controller area network (CAN) communication message including the signal type of the switch and a message ID to transmit the CAN communication message to the autonomous vehicle.

In an embodiment of the present disclosure, the processor may be configured to receive vehicle type information of the autonomous vehicle when the processor receives a remote control request from the autonomous vehicle. In an embodiment of the present disclosure, the processor may be configured to extract the switch information that is suitable for the vehicle type of the autonomous vehicle from the storage.

In an embodiment of the present disclosure, the processor may be configured to request and receive vehicle switch state information from the autonomous vehicle.

In an embodiment of the present disclosure, the processor may be configured to display the switch information that is suitable for the vehicle type extracted from the storage on the interface device and to display the current switch state information received from the autonomous vehicle.

In an embodiment of the present disclosure, the processor may be configured to transmit a driving command to the autonomous vehicle during remote control driving. However, when the autonomous vehicle cannot be driven, the processor may be further configured to notify the interface device of a chassis control switch operation recommendation.

In an embodiment of the present disclosure, the processor may be configured to transmit a driving command to the autonomous vehicle during remote control driving. However, when the autonomous vehicle cannot be driven, the processor may be further configured to highlight a chassis control switch on the interface device.

In an embodiment of the present disclosure, the processor may be configured to blink the chassis control switch displayed on the interface device or to change a color of the chassis control switch to highlight the chassis control switch.

In an embodiment of the present disclosure, the current switch state information of the autonomous vehicle may include an on-off state of a switch of the autonomous vehicle.

In an embodiment of the present disclosure an autonomous vehicle includes an autonomous driving control apparatus including a communication device configured to communicate with a control system: and a processor configured to request the control system to perform remote control in a situation where the remote control is required during autonomous driving. When a driving control request of a host vehicle is received while driving is performed by the remote control but driving of the host vehicle fails, the processor is further configured to request the control system to operate a chassis control switch.

In an embodiment of the present disclosure, the processor may be configured to transmit vehicle type information of the autonomous vehicle to the control system when the remote control is requested via the communication device.

In an embodiment of the present disclosure, when the processor receives a request for vehicle switch state information from the control system, the processor may be configured to transmit the vehicle switch state information to the control system.

In an embodiment of the present disclosure a remote control method for an autonomous vehicle includes: receiving, by a processor, a remote control request from the autonomous vehicle; activating, by the processor, switch information that is suitable for a vehicle type of the autonomous vehicle on the interface device by using vehicle type information and current switch state information of the autonomous vehicle; and displaying, by the processor, a current switch state of the autonomous vehicle on the interface device.

In an embodiment of the present disclosure, the switch information that is suitable for the vehicle type may be configured to include a switch type provided in the vehicle type and a signal type of a switch provided in the vehicle type.

In an embodiment of the present disclosure, the remote control method may further include: receiving, by the processor, a switch manipulation from a control manager through the interface device; generating, by the processor, a CAN communication message including a signal type of the switch and a message ID; and transmitting, by the processor, the CAN communication message to the autonomous vehicle.

In an embodiment of the present disclosure, the signal type of the switch may be configured to include: a first type in which an ON signal is outputted when the switch provided in the vehicle type is pressed once; and a second type in which the ON signal is outputted while the switch provided in the vehicle type is being pressed and an OFF signal is outputted when the switch is released.

In an embodiment of the present disclosure, the remote control method may further include transmitting, by the processor, a driving command to the autonomous vehicle during remote control driving and, when the autonomous vehicle cannot be driven, notifying the interface device of a chassis control switch operation recommendation. The remote control method may also include transmitting, by the processor, the driving command to the autonomous vehicle during the remote control driving and, when the autonomous vehicle cannot be driven, to highlight a chassis control switch on the interface device.

According to the present disclosure, it is possible to prevent confusion due to differences in position and operating conditions of switches of various vehicle types. In particular, the disclosed embodiments provide a unified operation switch interface to a control manager regardless of a vehicle mod& of a target vehicle during remote control of the vehicle. Further, the disclosed embodiments improve marketability of autonomous vehicles by preventing accidents caused by erroneous operation of the switches.

Furthermore, various improvements that can be directly or indirectly identified through this disclosure are provided.

DETAILED DESCRIPTION

Figure 1:
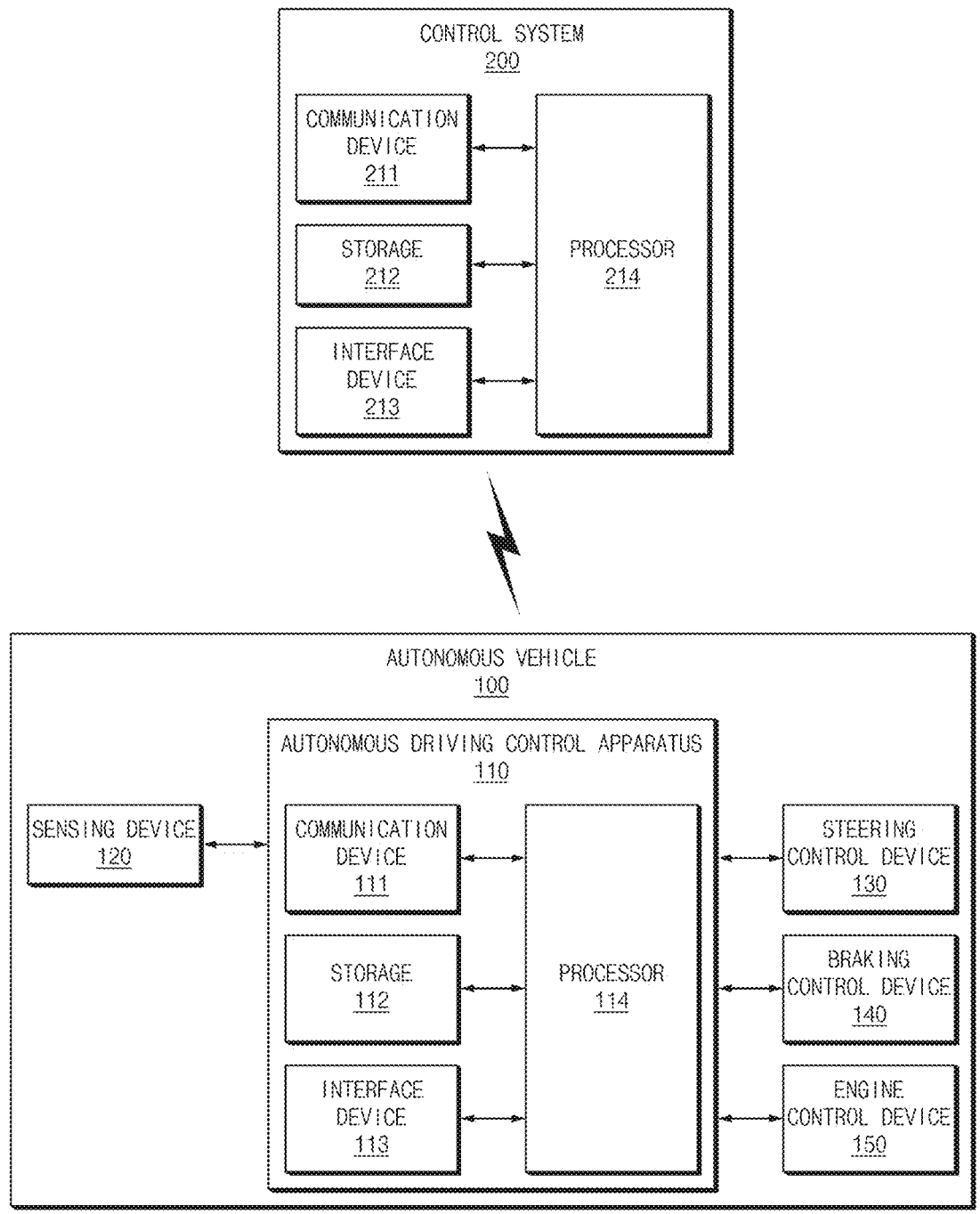
FIG. 1 illustrates a block diagram showing a configuration of a remote control system for an autonomous apparatus according to an embodiment of the present disclosure.

Hereinafter, various embodiments of the present disclosure are described below in detail with reference to the drawings. It should be noted that in adding reference numerals to constituent elements of each drawing, the same constituent elements have the same reference numerals where possible even though they are shown on different drawings. Furthermore, in describing embodiments of the present disclosure, when it is determined that detailed descriptions are related to well-known configurations or when function descriptions interfere with the understanding of the embodiments of the present disclosure, the detailed descriptions thereof have been omitted.

In describing constituent elements according to an embodiment of the present disclosure, terms such as first, second, A, B, (a), and (b) may be used. These terms are only for distinguishing the constituent elements from other constituent elements. The nature, sequences, or orders of the constituent elements are not limited by the terms. Furthermore, all terms used herein including technical scientific terms have the same meanings as those which are generally understood by those of ordinary skill in the technical field to which an embodiment of the present disclosure pertains (those of ordinary skill in the art) unless such terms are differently defined. Terms defined in a generally used dictionary shall be construed to have meanings consistent with those in the context of the related art and should not be construed to have idealized or excessively formal meanings unless they are clearly defined in the present specification.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are to be defined in the broadest sense, superseding any other implied definitions hereinbefore or hereinafter unless expressly asserted herein to the contrary, to mean one or more elements selected from the group comprising A, B, . . . and N. In other words, any combination of one or more of the elements A, B, . . . or N including any one element alone or in combination with one or more of the other elements which may also include, in combination, additional elements not listed.

In an embodiment of the present disclosure, a configuration, system, or the like, capable of remotely controlling a vehicle switch regardless of a vehicle type of an autonomous vehicle, is disclosed by incorporating a controller area network (CAN) communication message structure that includes a switch control command for each vehicle type to the autonomous vehicle based on switch database (DB) information for a plurality of vehicle types when remotely controlling the autonomous vehicle. A vehicle type may refer to a type of a vehicle (sedan, coupe, truck, etc.), a vehicle model, a name of a vehicle product, or the like. Furthermore, in an embodiment of the present disclosure, during remote driving control, when the vehicle fails to start, i.e., when the vehicle cannot execute a driving command, due to a road condition such as a rough road, despite receiving a driving control request signal, a configuration for requesting a chassis control switch action for starting a vehicle from a control system is disclosed.

Hereinafter, various embodiments of the present disclosure are described below in detail with reference to FIGS. 1-7.

FIG. 1 illustrates a block diagram showing a configuration of a remote control system for an autonomous apparatus according to an embodiment of the present disclosure.

Referring to FIG. 1, the remote control system for an autonomous vehicle according to an embodiment of the present disclosure includes an autonomous vehicle 100 and a control system 200. Further, remote control may be performed via communication between the autonomous vehicle 100 and the control system 200.

The autonomous vehicle 100 may include an autonomous driving control apparatus 110, a sensing device 120, a steering control apparatus, e.g., a steering control device 130, a braking control apparatus, e.g., a braking control device 140, and an engine control apparatus, e.g., an engine control device 150. In an embodiment, the autonomous driving control apparatus 110, the sensing device 120, the steering control device 130, the braking control device 140, and the engine control device 150 may be implemented with an example computer system 1000 described herein with respect to FIG. 7.

The autonomous driving control apparatus 110 according to an embodiment of the present disclosure may be implemented inside the vehicle. In an embodiment, the autonomous driving control apparatus 110 may be integrally formed with internal control units of the vehicle or may be implemented as a separate device to be connected to control units of the vehicle by separate connection means, a connection mechanism, a connection device, or the like.

In a situation in which autonomous driving is not possible, where remote control of the autonomous vehicle is required, the autonomous driving control apparatus 110 may request the control system 200 to perform remote control.

The autonomous driving control apparatus 110 may transmit vehicle model information of the autonomous vehicle 100 when a remote control request is made to the control system 200. The autonomous driving control apparatus 110 may transmit current switch state information, e.g., current switch state information data, of the autonomous vehicle 100 to the control system 200 upon a request from the control system 200.

When the autonomous driving control apparatus 110 receives a vehicle driving control command from the control system 200, the autonomous driving control apparatus 110 executes the driving control command. However, when the autonomous vehicle 100 fails to start, i. e., fails to start executing the driving control command, due to a condition situation, e.g., a road condition such as rough road, a request may be made to the control system 200 to operate the chassis control switch such that the autonomous vehicle 100 may exit the situation, e.g., a rough road. In an embodiment, the chassis control switch may include a wheel lock switch, a differential rock switch, an off road switch, a rocking free switch, an engine PTO switch, an axle up/down switch, a pusher axle up/down switch, a diesel particulate filter (DPF), a manual regeneration switch, and the like.

Referring to FIG. 1, the autonomous driving control apparatus 110 may include a communication device 111, a storage 112, an interface device 113, and a processor 114.

In an embodiment, the communication device 111 may include a hardware device implemented with various electronic circuits to transmit and receive signals through a wireless or wired connection. The communication device 111 may transmit and receive information based on in-vehicle devices and in-vehicle network communication techniques. In an embodiment, the in-vehicle network communication techniques may include controller area network (CAN) communication, local interconnect network (LIN) communication, flex-ray communication, Ethernet communication, and the like.

Furthermore, the communication device 111 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), Ethernet communication, etc. Furthermore, short-range communication technique may include Bluetooth, ZigBee, ultra-wideband (UWB), radio frequency identification (RAD), infrared data association (IrDA), and the like. For example, the communication device 111 may perform wireless communication with the control system 200. In particular, the communication device 111 may transmit vehicle information including vehicle type or model information, vehicle switch state information, vehicle position information (e.g., vehicle coordinates), vehicle surrounding information (e.g., obstacle information), a remote control request, a vehicle path, and the like to the control system 200. The communication device 111 may receive a remote control command or the like from the control system 200. The communication device 111 may further include a separate communication device (such as a modem) for communicating with the control system 200.

The storage 112 may store sensing results detected by the sensing device 120, information received from the control system 200, data and/or algorithms required for the processor 114 to operate, and the like.

In an embodiment, the storage 112 may store vehicle information including vehicle surrounding information (image data captured through a camera), a vehicle path (driving path from origin to destination), a remote control command received from the control system 200, and the like.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input means, an input mechanism, an input device, or the like for receiving a control command from a user and an output means, an output mechanism, an output device, or the like for outputting an operation state of the autonomous driving control apparatus 110 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display.

The output means may include a display and may further include a voice output means such as a speaker. In an embodiment, when a touch sensor formed of a touch film, a touch sheet, or a touch pad is provided on the display, the display may operate as a touch screen. The display may be implemented in a form in which an input device and an output device are integrated.

In an embodiment, the display may include at least one of a liquid crystal display (LCD), a thin film transistor liquid crystal display (TFT LCD), an organic light emitting diode display (OLED display), a flexible display, a field emission display (FED), or a 3D display or any combination thereof.

In an embodiment, the interface device 113 may be implemented as a head-up display (HUD), a cluster, an audio video navigation (AVN), a human machine interface (HM), a user setting menu (USM), or the like.

For example, the interface device 113 may display a remote control command received from the control system 200, and the like. The interface device 113 may receive command for remote control command request or approval from a driver, and for this purpose, may include a mouse, a keyboard, a touch screen, and a microphone.

The processor 114 may be electrically connected to, i.e., coupled with, the communication device 111, the storage 112, the interface device 113, and the like. The processor 114 may electrically control each component and may include an electrical circuit that executes software commands stored in the storage 112, thereby performing various data processing and calculation operations described below.

The processor 114 may process a signal transferred between components of the autonomous driving control apparatus 110. The processor 114 may perform overall control such that each of the components can perform its respective function normally.

The processor 114 may be implemented in the form of hardware, software, or a combination of hardware and software, or may be implemented as microprocessor. The processor 114 may include, e.g., an electronic control unit (ECU), a micro controller unit (MCU), or other sub-controllers mounted in the vehicle.

The processor 114 may request the control system 200 to perform remote control when the remote control is required during autonomous driving. In an embodiment, when in the autonomous driving mode of a vehicle on a corresponding path that is not possible to pass due to an obstacle or the like, the processor 114 may determine that the autonomous driving is impossible and remote control by the control system 200 is required.

The processor 114 may transmit vehicle type information when a remote control request is made by the processor 114 to the control system 200. Further, the processor 114 may transmit current switch state information of the autonomous vehicle 100 to the control system 200 based on a request of the control system 200.

When a driving control request of the host vehicle is received while driving is performed by remote control but the execution of the driving of the host vehicle fails, i.e., when the host vehicle fails to start execution of the driving control request due to encountering a pit, an obstacle, and the like, the processor 114 may request the control system 200 to operate a chassis control switch.

The sensing device 120 may include one or more sensors that sense an obstacle (e.g., a preceding vehicle or a rear vehicle) positioned around the vehicle and measure a distance to the obstacle, a relative speed thereof, and/or steering thereof. The sensing device 120 may include a plurality of sensors to sense an external object of the vehicle, to obtain information related to a position of the external object, a speed of the external object, a moving direction of the external object, and/or a type of the external object (e.g., vehicles, pedestrians, bicycles, or motorcycles, and the like.). To this end, the sensing device 120 may include an ultrasonic sensor, a radar, a camera, a laser scanner, and/or a corner radar, a lidar, an acceleration sensor, a yaw rate sensor, a torque measurement sensor and/or a wheel speed sensor, a steering angle sensor, and the like. Furthermore, the sensing device 120 may include an indoor camera, an ultrasonic wave sensor, and the like to detect the movement of an object in the vehicle. Then, the processor 114 may detect a situation such as when an occupant puts an object in a vehicle and gets off the vehicle.

The steering control device 130 may be configured to control a steering angle of the autonomous vehicle 100. The steering control device 130 may include a steering wheel, an actuator interlocked with the steering wheel, and a controller controlling the actuator.

The braking control device 140 may be configured to control braking of the autonomous vehicle 100 and may include a controller that controls a brake thereof.

The engine control device 150 may be configured to control engine driving of the autonomous vehicle 100. The engine control device 150 may include a controller that controls a speed of the vehicle 100.

The control system 200 may receive vehicle type information of the autonomous vehicle 100 and the remote control request from the autonomous vehicle 100. The control system 200 may configure an environment for generating a CAN communication message for manipulation of a vehicle switch suitable for, i.e., that corresponds to, a vehicle type of the autonomous vehicle 100 for remote control of the autonomous vehicle 100. In an embodiment, the control system 200 may be implemented with the example computer system 1000 described herein with respect to FIG. 7.

The control system 200 may include a communication device 211, a storage 212, an interface device 213, and a processor 214.

The communication device 211 is a hardware device implemented with various electronic circuits to transmit and receive signals through a wireless or wired connection. The communication device 211 may transmit and receive information based on in-vehicle devices and in-vehicle network communication techniques. In an embodiment, the in-vehicle network communication techniques may include a controller area network (CAN) communication, a local interconnect network (LIN) communication, flex-ray communication, Ethernet communication, and the like.

In addition, the communication device 211 may perform communication by using a server, infrastructure, or third vehicles outside the vehicle, and the like through a wireless Internet technique or short range communication technique. Herein, the wireless Internet technique may include wireless LAN (WLAN), wireless broadband (Wibro), Wi-Fi, world Interoperability for microwave access (Wimax), etc. In addition, short-range communication technique may include Bluetooth, ZigBee, ultra-wideband (UWB), radio frequency identification (RFD), infrared data association (IrDA), and the like. For example, the communication device 211 may perform wireless communication with the autonomous vehicle 100, may receive a remote control request, vehicle type information, state information of a vehicle switch, etc. from the autonomous vehicle 100. The communication device 211 may transmit a remote control command for controlling vehicle switch to the autonomous vehicle 100.

The storage 212 may store information received from the autonomous vehicle 100, and data and/or algorithms required for the processor 214 to operate, and the like. In an embodiment, the storage 212 may store vehicle surrounding information and vehicle information (e.g., vehicle type information) received from the autonomous vehicle 100. In particular, the storage 212 stores switch information for each vehicle type of a plurality of vehicle types into a database. In an embodiment, the switch information for each vehicle type may include a type of a switch mounted for each vehicle type, switch signal type information for each vehicle type, and the like. For example, various interior lights of a vehicle, e.g., dome lights, of a small vehicle may be turned on and off by one switch. When the switch is on, the dome light continues to be on, and when the switch is turned off, the dome light is turned off. On the other hand, since the dome lights of a large truck are turned on and off through a plurality of switches positioned at different positions, even when the first switch is on, when the second switch changes from a current manipulation state to an opposite state, e.g., when the second switch changes from an on state to an off state, the dome lights may be turned off. In other words, even when the first switch is in the on state, when the second switch is changed to the off state, the dome lights may be turned off.

As such, when the switch of the small vehicle is on, a value of "1" is continuously outputted, and when the switch is off, a value of "0" is outputted. In contrast, the value of "1" is outputted at the moment the switch of the large truck is manipulated, instead of a current on or off state of the switch of the large truck.

Accordingly, the control system 200 may generate a CAN message based on a signal type for remote control of a vehicle switch for each vehicle type of a target vehicle to be controlled remotely.

The storage 212 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

In an embodiment, the interface device 213 may include an input means an input mechanism, an input device, or the like capable of receiving a control command from an operator. The interface device 213 may also include an output means, an output mechanism, an output device, or the like for outputting an operation state of the control system 200 and results thereof. Herein, the input means may include a key button, and may further include a mouse, a keyboard, a touch screen, a microphone, a joystick, a jog shuttle, a stylus pen, a virtual accelerator pedal, a virtual brake pedal, a virtual steering, and the like. In addition, the input means may further include a soft key implemented on the display. For example, the interface device 213 may display map information in which a vehicle path, vehicle surrounding information, a current position of the autonomous vehicle 100, surrounding object information, etc. received from the autonomous vehicle 100 are marked. For example, the interface device 213 may include all communication terminals such as a personal computer (PC), a notebook computer, a smartphone, a tablet PC, a pad, a personal digital assistant (PDA), and a wearable device.

The output means may include a display and may further include a voice output means such as a speaker. In this case, when a touch sensor formed of a touch film, a touch sheet, or a touch pad is provided on the display, the display may operate as a touch screen. The display may be implemented in a form in which an input device and an output device are integrated. In an embodiment, the output means may include a small LCD touch screen, any other electrical device that is operable to display information, and the like. In an embodiment, the display may include at least one of a liquid crystal display (LCD), a thin film transistor liquid crystal display (TFT LCD), an organic light emitting diode display (OLED display), a flexible display, a field emission display (FED), or a 3D display or any combination thereof.

For example, the interface device 213 may be implemented as a switch panel. The interface device 213 may be configured to be touched to manipulate a vehicle switch so that a screen to which a manipulation command may be inputted may be displayed thereon. Furthermore, the interface device 213 may group vehicle switches by function to display them, it may select the groups to select the vehicle switches, and each group may be moved on the screen by touching and dragging. Furthermore, the interface device 213 may be touched by a control manager to input a manipulation command of a vehicle switch and may highlight switches that require manipulation so that the control manager can recognize it. The control manager may be implemented by the processor 214. In an embodiment, the control manager may be implemented with the example computer system 1000 described herein with respect to FIG. 7.

The processor 214 may be electrically connected, i.e., coupled, with the communication device 211, the storage 212, the interface device 213, and the like. The processor 214 may electrically control each component. The processor 214 may be an electrical circuit that executes software commands, thereby performing various data processing and calculations described below.

The processor 214 may process a signal transferred between components of the control system 200 and may perform overall control such that each of the components can perform its function normally. The processor 214 may be implemented in the form of hardware, software, or a combination of hardware and software, or may be implemented as microprocessor.

When receiving a remote control request from the autonomous vehicle 100, the processor 214 may activate switch information that is suitable for, i.e., that corresponds to, the vehicle type of the autonomous vehicle 100 on the interface device 213. The processor 214 may display a current switch state of the autonomous vehicle 100 on the interface device 213 by using vehicle type information of the autonomous vehicle 100 and current switch state information.

In an embodiment, the switch information that is suitable for, i.e., that corresponds to, a vehicle type may include a switch type provided for the vehicle type and a signal type of a switch provided for the vehicle type. In addition, the current switch state of the autonomous vehicle 100 may include an on-off state of the switch of the autonomous vehicle 100.

Furthermore, the signal type may include a first type in which an ON signal is outputted when the switch provided in the vehicle type is pressed once, and a second type in which the ON signal is outputted while the switch provided in the vehicle type is being pressed and an OFF signal is outputted when the switch is released. For example, when a target vehicle to be remotely controlled, e.g., the autonomous vehicle 100, is a vehicle equipped with a vehicle switch having the first type of signal type, when a vehicle switch manipulation command is inputted by a control manager, the processor 214 may generate a corresponding vehicle switch manipulation command as a CAN communication message and signal type information of the first type, to transmit them to the autonomous vehicle 100.

Accordingly, when a switch manipulation command is inputted to the interface device 213 by the control manager, the processor 214 generates a CAN communication message which includes the signal type and a message ID of the switch. The processor 214 transmits the CAN communication message to the autonomous vehicle 100. In other words, the processor 214 transmits a remote control command to the autonomous vehicle 100 based on the signal type based on a type of the switch for each corresponding vehicle type, so that the autonomous vehicle 100 may execute the corresponding command.

Upon receiving a remote control request from the autonomous vehicle 100, the processor 214 may further receive vehicle type information of the autonomous vehicle 100. The processor 214 may extract the corresponding switch information based on the vehicle type information of the autonomous vehicle 100 from the storage 212. The processor 21 may display the switch information that corresponds to the vehicle type of the autonomous vehicle 100 on a screen of the interface device 213

The processor 214 may request and receive vehicle switch state information from the autonomous vehicle 100. The processor 214 may display switch information corresponding to the vehicle type extracted from the storage 212 on the interface device 213. The processor 214 may display the vehicle switch state information received from the autonomous vehicle 100 on the interface device 213.

In an embodiment, a driving command may be transmitted to the autonomous vehicle 100 during remote control driving. In an embodiment, the processor 214 may determine that the autonomous vehicle cannot be driven, i.e., cannot execute the driving command. In an embodiment, when the processor 214 determines that the autonomous vehicle 100 cannot be driven, the processor 214 may notify the interface device 213 of a chassis control switch operation recommendation.

In another embodiment, when the driving command is transmitted by the processor 214 to the autonomous vehicle 100 during remote control driving and the processor 214 determines that the autonomous vehicle 100 cannot be driven, e.g., the autonomous vehicle 100 cannot execute the driving command, the processor 214 may highlight a chassis control switch on the interface device 213.

In an embodiment, the processor 214 may cause the chassis control switch displayed on the interface device 213 to blink in order to highlight the switch. Alternatively, or additionally, the processor 214 may change a color of the chassis control switch on the display of the interface device 213 in order to highlight the switch.

Figure 2A:
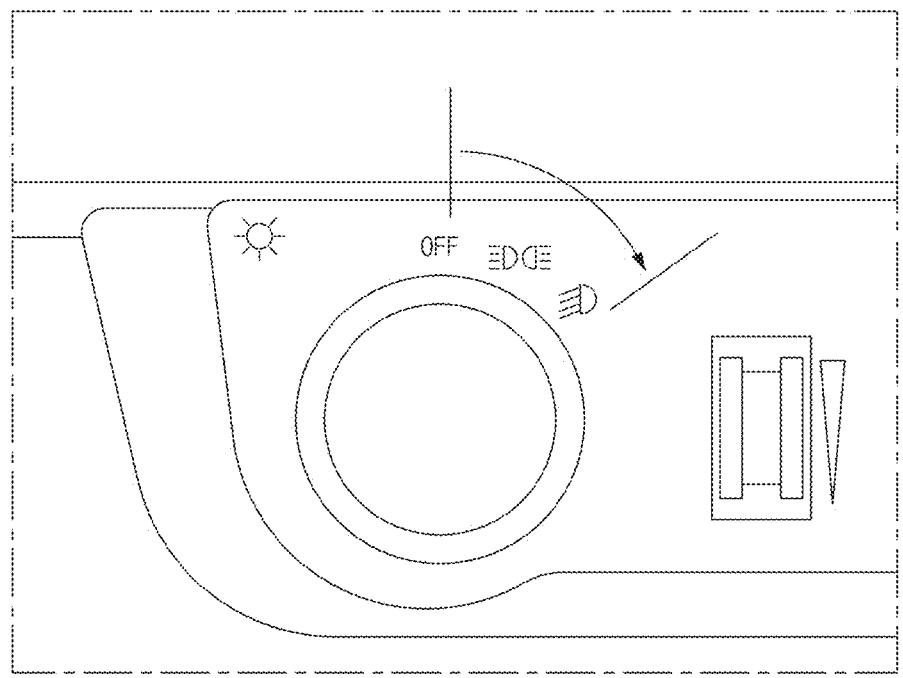
FIGS. 2A and 2B each illustrate a schematic diagram showing a headlight switch for a vehicle type according to an embodiment of the present disclosure.
Figure 2B:
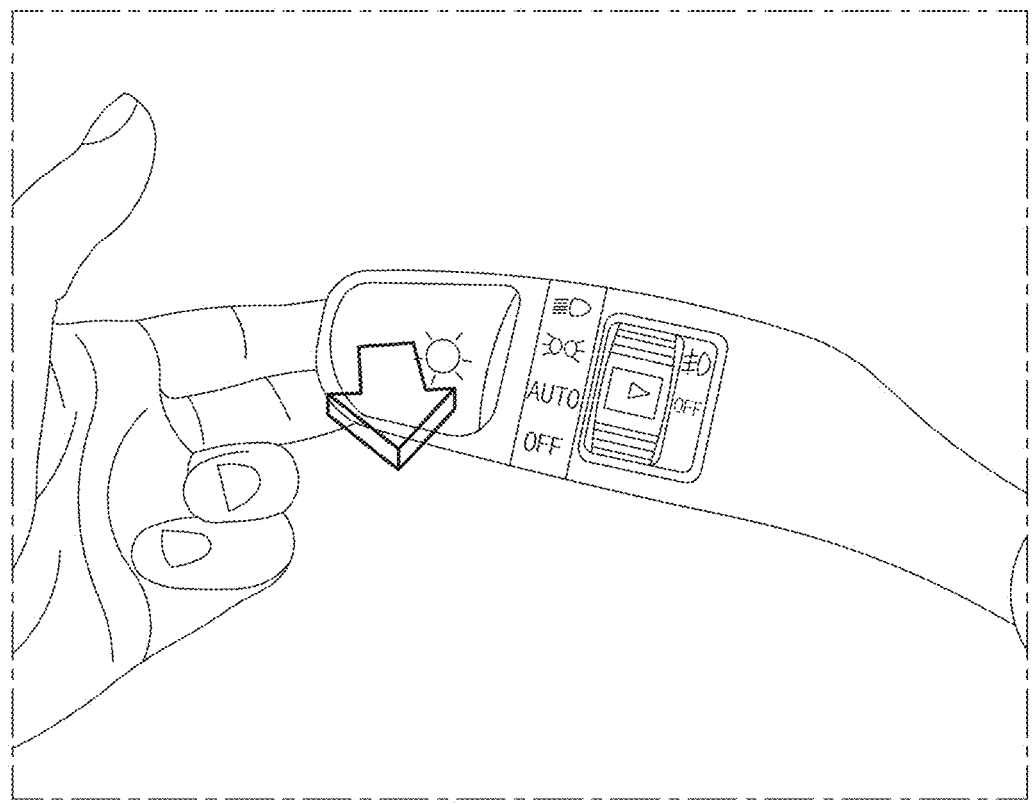

FIGS. 2A and 2B each illustrate a schematic diagram showing a headlight switch for a vehicle type according to an embodiment of the present disclosure.

FIG. 2A illustrates an example of a headlight control switch of a heavy truck and FIG. 2B illustrates an example of a headlight control switch of a passenger vehicle.

In an embodiment, a vehicle switch such as a headlight control switch may operate differently for each vehicle type of a plurality of vehicle types. Therefore, a control manager of the control system 200 needs to provide an interface for manipulating the vehicle switch regardless of a vehicle type of a target vehicle to be remotely controlled.

Figure 3:
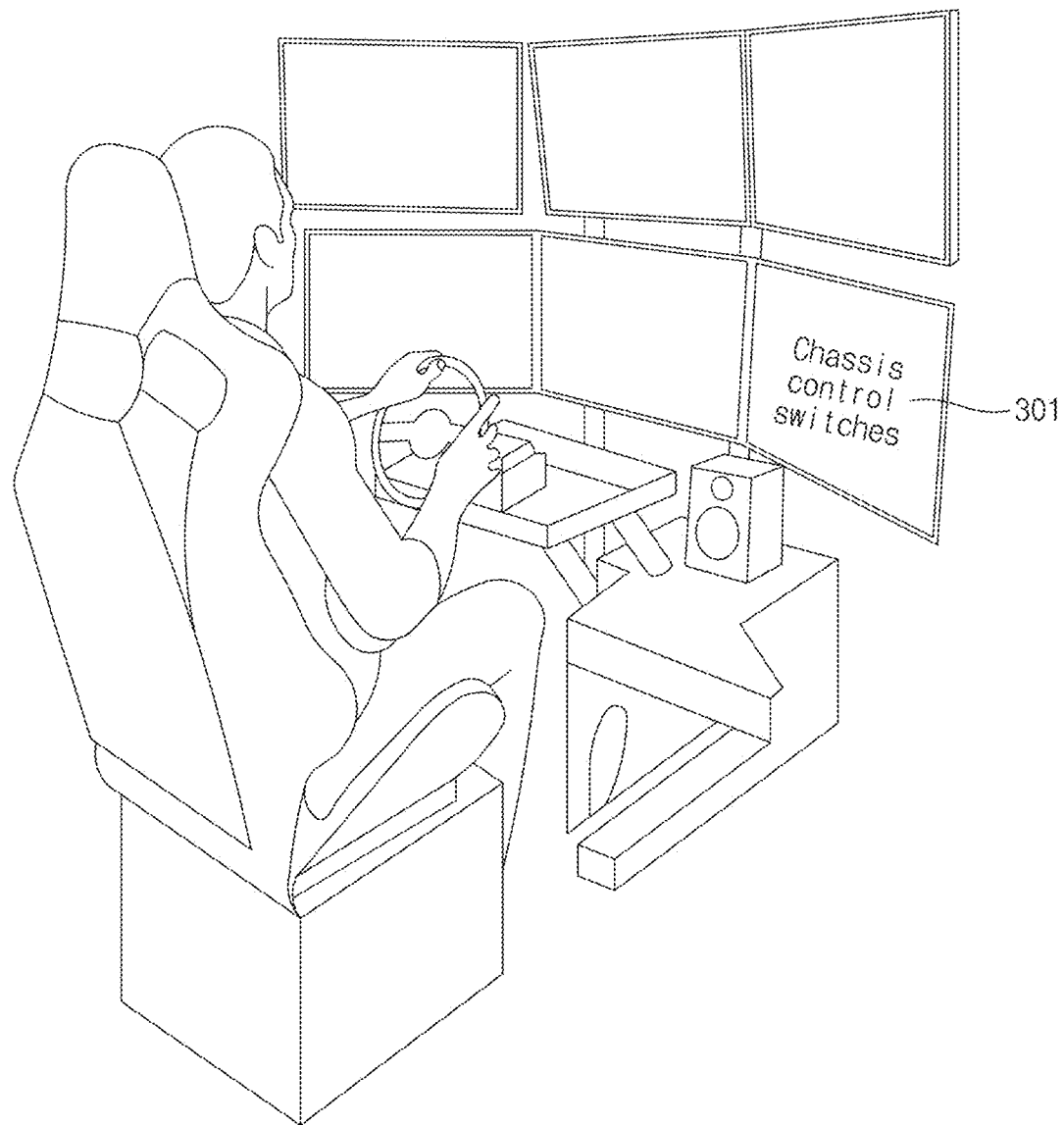
FIG. 3 illustrates an outer schematic diagram showing a control system for remote control by a control manager according to an embodiment of the present disclosure.

FIG. 3 illustrates an outer schematic diagram showing a control system for remote control by a control manager according to an embodiment of the present disclosure.

Referring to FIG. 3, the control manager may display vehicle switches through a plurality of displays 301. The control manager may group and display the vehicle switches by function and field.

Such switch groups may include external lighting control switches, indoor lighting control switches, autonomous driving control switches, driving and braking control switches, multimedia switches, door control switches, air conditioning control switches, shift control switches, chassis control switches, other classification switches, and the like.

The control system 200 may blink the vehicle switches that are necessary for vehicle control among the vehicle switches, i.e., the control system 200 may cause the vehicle control switches to blink. Alternatively, or additionally, the control system 200 may change a color thereof to display the vehicle switches such that the control manager can recognize them.

For example, when a start control of the autonomous vehicle 100 is not possible due to an external condition (e.g., a road condition and the like), the control system 200 may output a notification recommending an operation of the chassis control switches on a screen of a display 301 in order to recommend the operation of the chassis control switches. The control system 200 may further blink the chassis control switches or may change a color thereof to display them.

Figure 4A:
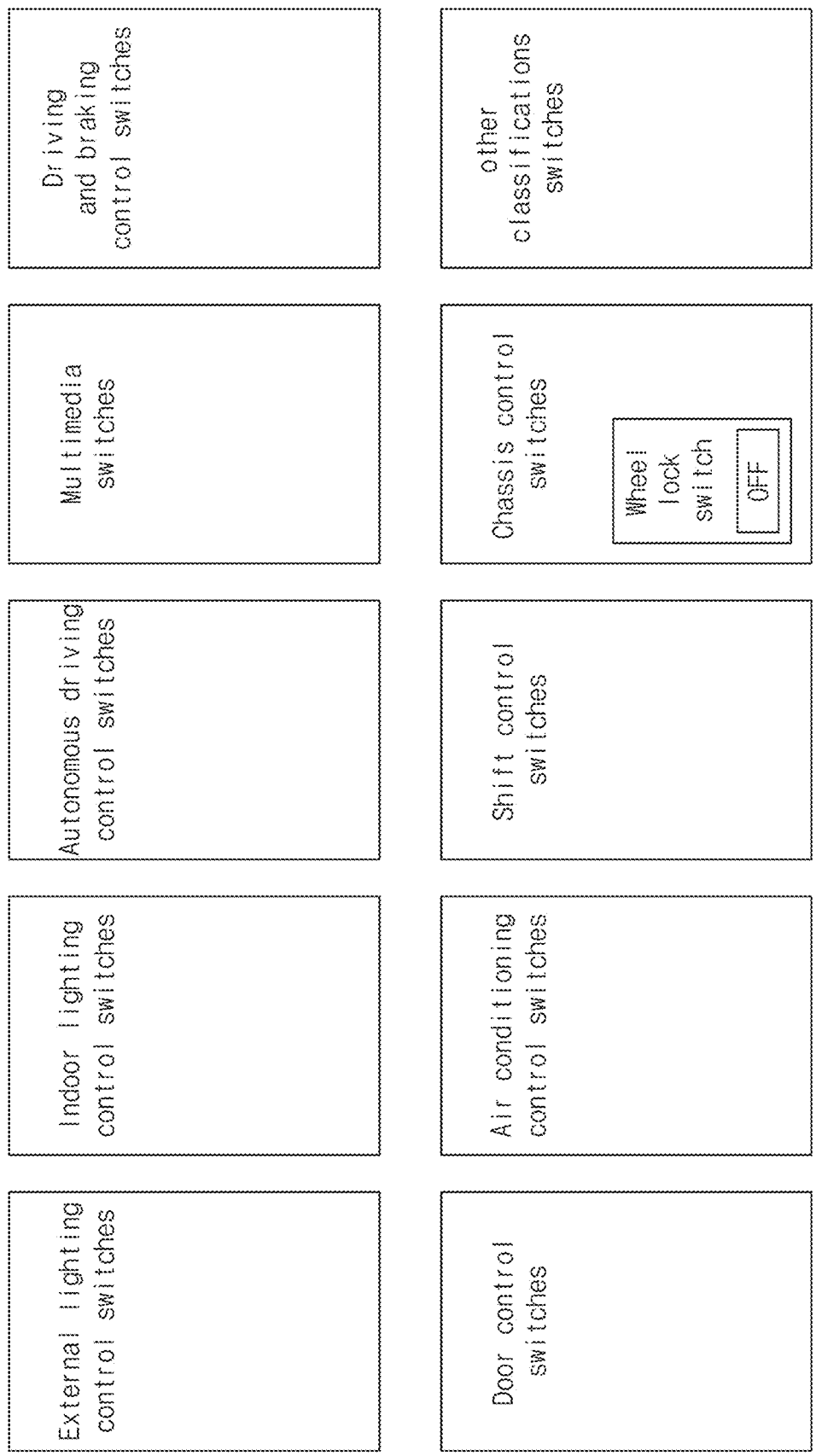
FIGS. 4A and 4B illustrate views for describing an example of a configuration screen of switches displayed on an interface device in a control system according to an embodiment of the present disclosure.
Figure 4B:

FIGS. 4A and 4B illustrate views of a configuration screen of switches displayed on an interface device 213 of the control system 200 according to an embodiment of the present disclosure.

Referring to FIG. 4A, external lighting control switches; indoor lighting control switches, autonomous driving control switches, multimedia switches, driving and braking control switches, door control switches, air conditioning control switches, shift control switches; chassis control switches, other classification switches, etc. are configured to be displayed sequentially. Furthermore, a state of a wheel lock switch among the chassis control switches is displayed.

Referring to FIG. 4B, in a screen of FIG. 4A, in an embodiment, positions of the multimedia switches and the driving and braking control switches may be exchanged. Further, the wheel lock switch belonging to the chassis control switches may be moved to be included in the other classification switches. The control manager may move the switches in a touch-and-drop method.

As such, the control system 200 may change a position of each of the switches via the control manager. The control system 200 may change a name of an already generated switch group or may generate a new group. Furthermore, the control system 200 may change a position between the switches and may move an entire switch group. In particular, the control manager may change a group position by long pressing the switches.

Figure 5:
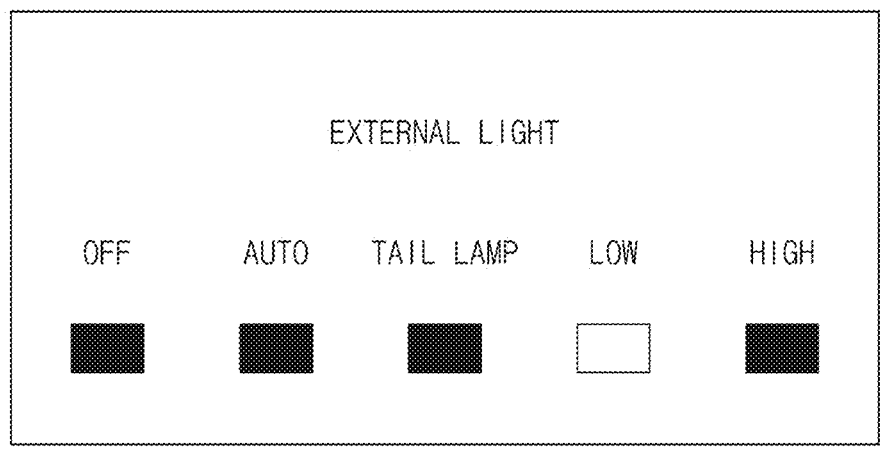
FIG. 5 illustrates a view for describing an example of a light switch state of a vehicle in a control system according to an embodiment of the present disclosure.

FIG. 5 illustrates a view of a light switch state of a vehicle in a control system according to an embodiment of the present disclosure.

Referring to FIG. 5, a state in which only a low beam is turned on among external lights of the vehicle is shown. A state of a light switch of the vehicle may be displayed on the display 301 of the control system 200. Then, the control manager may check and manipulate a current state of a vehicle light of the autonomous vehicle 100. For example, when the state of the vehicle light is not synchronized, a low beam may be already on. However, the control manager does not know that the low beam is already on and manipulates a low beam switch to turn the low beam off. Then, in an embodiment of the present disclosure, switch information for each vehicle type and a switch state of the autonomous vehicle 100 may be displayed on the display 301 by the control system 200.

Figure 6:
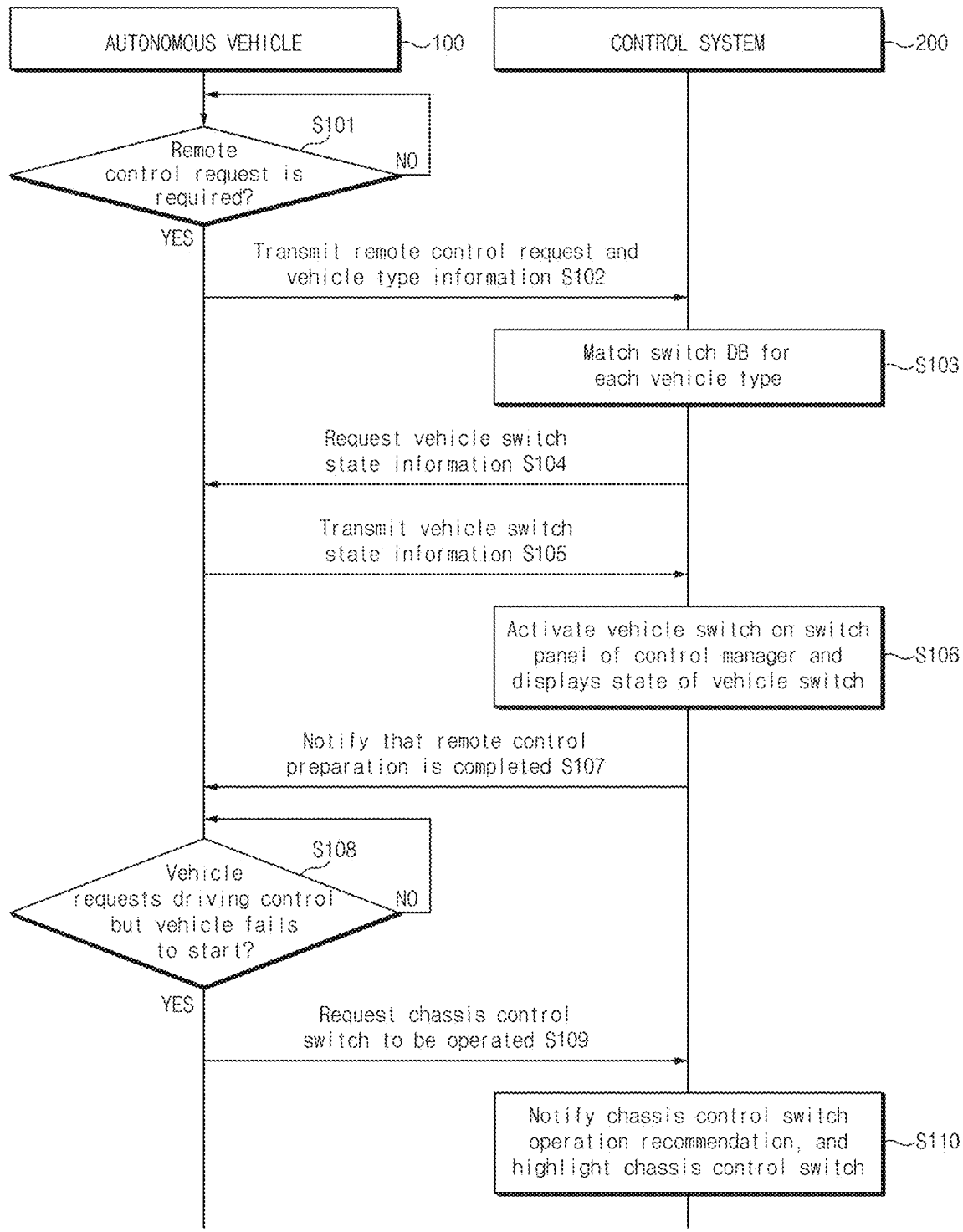
FIG. 6 illustrates a flowchart showing a remote control method for an autonomous vehicle according to an embodiment of the present disclosure.

Hereinafter, a remote control method for an autonomous vehicle according to an embodiment of the present disclosure is described in detail with reference to FIG. 6. FIG. 6 illustrates a flowchart showing a remote control method for an autonomous vehicle according to an embodiment of the present disclosure.

Hereinafter, it is assumed that the autonomous driving control apparatus 110 of the autonomous vehicle 100 of FIG. 1 and the control system 200 perform processes of FIG. 6. Furthermore, in the description of FIG. 6, it may be understood that operations described as being performed by each system are controlled by a processor of each of the systems.

Referring to FIG. 6, the autonomous vehicle 100 determines whether driving in a current path is impossible due to an external environment condition during autonomous driving. When the autonomous vehicle 100 determines that driving on the current path is impossible, the autonomous vehicle 100 determines that a remote control request is required (S101). Then, the autonomous vehicle 100 requests the control system 200 to perform remote control and transmits vehicle type information (S102).

Then, the control system 200 matches switch information for the corresponding pre-stored vehicle type based on the vehicle type information transmitted from the autonomous vehicle 100 (S103). Then, the control system 200 may configure an environment for manipulating a switch that is suitable for, i.e., that corresponds to, a vehicle type of the autonomous vehicle 100. For example, the control system 200 may implement functions of all switches based on the vehicle type so that they can be operated by a control manager, may identify signal types of all switches depending on the vehicle type, and when the control manager manipulates the switches, may generate a CAN message including the signal type and a message ID to transmit it to the autonomous vehicle 100.

The control system 200 requests vehicle switch state information from the autonomous vehicle 100 after configuring an environment for switch manipulation by matching switch information by vehicle type (S104).

Then, the autonomous vehicle 100 transmits the vehicle switch state information to the control system 200. Further, the control system 200 activates a vehicle switch on an interface device of the control manager and displays a state of the vehicle switch (S106).

Then, the control system 200 notifies the autonomous vehicle 100 that remote control preparation is completed and starts remote control (S107).

While the driving control of the vehicle is performed by remote control, the autonomous vehicle 100 determines whether the vehicle has failed to start execution of the remote control command (S108). For example, when a wheel of the autonomous vehicle 100 falls out due to a pit, i.e., a pothole or the like, in the driving path in a rough road, the autonomous vehicle 100 must exit the driving path by operating a chassis control switch such as an off-road switch. Then, the autonomous vehicle 100 requests the control system 200 to operate a chassis control switch (S109).

In particular, although FIG. 6 discloses an embodiment in which the autonomous vehicle 100 determines departure failure of a host vehicle, the control system 200 may determine the departure failure of the autonomous vehicle 100.

Then, the control system 200 notifies a chassis control switch operation recommendation through the interface device 213 and highlights the chassis control switch (S110). Then, the control manager recognizes that an operation of the chassis control switch is necessary and operates the chassis control switch and the control system 200 transmits an operation command of the chassis control switch to the autonomous vehicle 100.

As such, according to an embodiment of the present disclosure, when the control manager remotely controls various types of vehicles when manipulating a different switch for each vehicle type, to prevent confusion due to a position and an operation method of the switch, a unified interface device may be provided so that the control manager can manipulate the switch by touching it.

Furthermore, according to an embodiment of the present disclosure, vehicle switch control is possible regardless of the vehicle type of a target vehicle to be remotely controlled by generating a CAN message and transmitting the CAN message to the autonomous vehicle 100 based on a difference in a signal type of the vehicle switch for each vehicle type.

Furthermore, according to an embodiment of the present disclosure, it is possible to notify a need to manipulate a corresponding vehicle switch on a screen of the control system by determining a case where a switch manipulation of an autonomous vehicle is necessary, so as to induce the control manager to recognize this and manipulate the vehicle switch.

Figure 7:
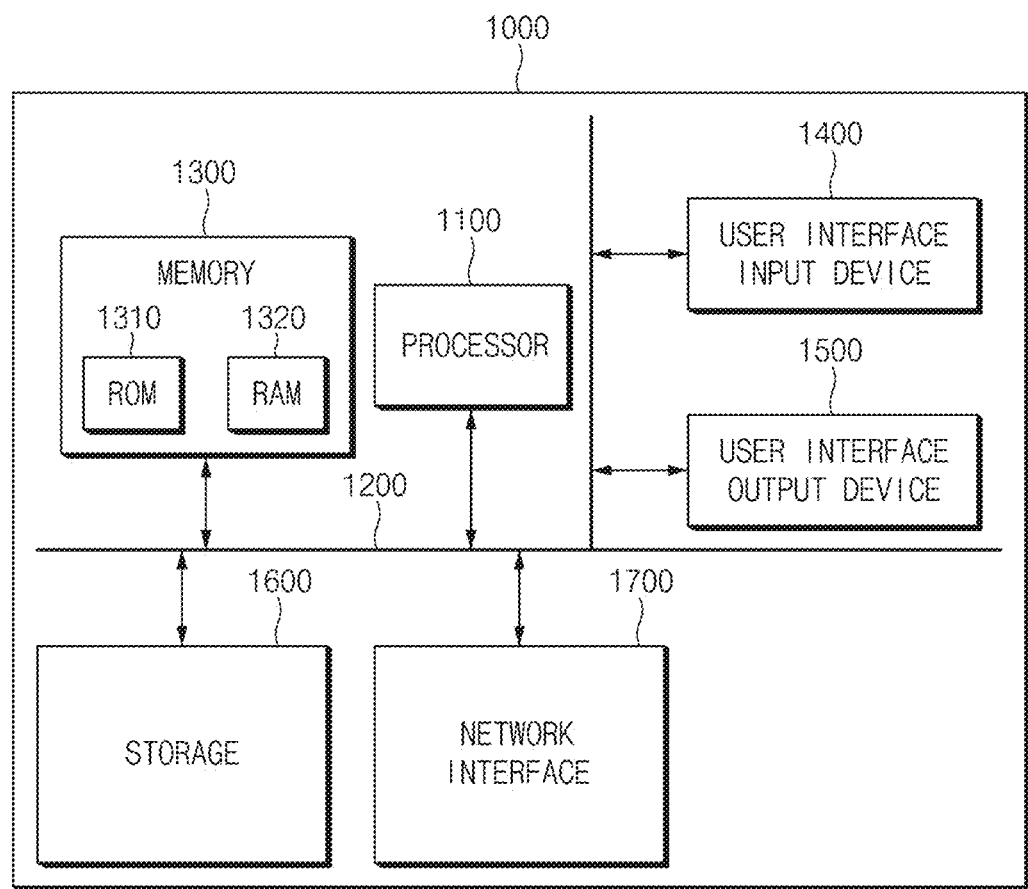
FIG. 7 illustrates a computing system according to an embodiment of the present disclosure.

FIG. 7 illustrates a computing system according to an embodiment of the present disclosure.

Referring to FIG. 7, the computing system 1000 includes at least one processor 1100 connected via a bus 1200, a non-transitory memory 1300, a user interface input device 1400, a user interface output device 1500, and a storage 1600, and a network interface 1700.

The processor 1100 may be a central processing unit (CPU) or a semiconductor device that performs processing on commands, e.g., computer executable instructions, stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of the method or algorithms described in connection with the embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

A storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure. Those of ordinary skill in the art to which the present disclosure pertains may make various modifications and variations without departing from the essential characteristics of the present disclosure.

Therefore, the embodiments disclosed in the present disclosure are not intended to limit the technical ideas of the present disclosure, but to explain them. The scope of the technical ideas of the present disclosure is not limited by the disclosed embodiments. The protection range of the present disclosure should be interpreted by the claims below. All technical ideas within the equivalent range should be interpreted as being included in the scope of the present disclosure.

What is claimed is:

1. A control system comprising:
    an interface device configured to receive a switch manipulation command by a control manager to control a switch of an autonomous vehicle; and
    a processor configured to
        activate switch information that is suitable for a vehicle type of the autonomous vehicle on the interface device by using vehicle type information received by the processor from the autonomous vehicle,
        set a displayed switch operation state of the autonomous vehicle on the interface device to the same information as a current switch operation state of the autonomous vehicle by using information of a current switch manipulation state currently set in the autonomous vehicle and received by the processor from the autonomous vehicle, and
        display the current switch operation state of the autonomous vehicle on the interface device when the processor receives a remote control request from the autonomous vehicle,
    wherein the control system is located remotely from the autonomous vehicle and configured to remotely control the autonomous vehicle,
    wherein the control manager is configured to manipulate the interface device of the control system,
    wherein the processor is configured to transmit a driving command to the autonomous vehicle during remote control driving and, when the autonomous vehicle cannot be driven, the processor is further configured to highlight a chassis control switch on the interface device,
    wherein the control manager is configured to operate the chassis control switch on the interface device based on the chassis control switch being highlighted, and
    wherein the processor is configured to transmit an operation command to the autonomous vehicle based on the highlighted chassis control switch being operated on the interface device.

2. The control system of claim 1, further comprising a non-transitory memory configured to store switch information for a plurality of vehicle types, including the vehicle type of the autonomous vehicle.

3. The control system of claim 2, wherein the processor is configured to receive vehicle type information of the autonomous vehicle when the processor receives the remote control request from the autonomous vehicle, and to extract the switch information that is suitable for the vehicle type of the autonomous vehicle from the memory.

4. The control system of claim 3, wherein the processor is configured to request and receive vehicle switch state information from the autonomous vehicle.

5. The control system of claim 4, wherein the processor is configured to display the switch information that is suitable for the vehicle type extracted from the memory on the interface device, and to display the current switch state information received from the autonomous vehicle.

6. The control system of claim 1, wherein the switch information that is suitable for the vehicle type is configured to include a switch type provided in the vehicle type and a signal type of a switch provided in the vehicle type.

7. The control system of claim 6, wherein the signal type is configured to include:
    a first type in which an ON signal is outputted when the switch provided in the vehicle type is pressed once; and
    a second type in which the ON signal is outputted while the switch provided in the vehicle type is being pressed and an OFF signal is outputted when the switch is released.

8. The control system of claim 6, wherein, when a switch manipulation is inputted to the interface device by the control manager, the processor is configured to generate a controller area network (CAN) communication message including the signal type of the switch and a message ID to transmit the CAN communication message to the autonomous vehicle.

9. The control system of claim 1, wherein when the autonomous vehicle cannot be driven, the processor is further configured to notify the interface device of a chassis control switch operation recommendation.

10. The control system of claim 1, wherein the processor is configured to blink the chassis control switch displayed on the interface device or to change a color of the chassis control switch to highlight the chassis control switch.

11. The control system of claim 1, wherein the current switch state of the autonomous vehicle includes an on-off state of a switch of the autonomous vehicle.

12. A remote control method for an autonomous vehicle, the remote control method comprising:
    receiving, by a processor of a control system located remotely from the autonomous vehicle and configured to remotely control the autonomous vehicle, a remote control request from the autonomous vehicle;

activating, by the processor, switch information that is suitable for a vehicle type of the autonomous vehicle on an interface device of the control system, by using vehicle type information received from the autonomous vehicle by the processor, wherein the interface device is configured to receive a switch manipulation command by a control manager to control a switch of the autonomous vehicle and wherein the control manager is configured to manipulate the interface device of the control system;

setting, by the processor, a displayed switch operation state of the autonomous vehicle on the interface device to the same information as a current switch operation state of the autonomous vehicle by using information of a current switch manipulation state currently set in the autonomous vehicle and received from the autonomous vehicle by the processor;

displaying, by the processor, the current switch operation state of the autonomous vehicle on the interface device;

transmitting, by the processor, a driving command to the autonomous vehicle during the remote control driving and, when the autonomous vehicle cannot be driven, highlighting, by the processor, a chassis control switch on the interface device;

operating, by the control manager, the chassis control switch on the interface device based on the chassis control switch being highlighted; and transmitting, by the control manager, an operation command to the autonomous vehicle based on the highlighted chassis control switch being operated on the interface device.

13. The remote control method of claim 12, wherein the switch information that is suitable for the vehicle type is configured to include a switch type provided in the vehicle type and a signal type of a switch provided in the vehicle type.

14. The remote control method of claim 13, further comprising:

receiving, by the processor, a switch manipulation request from a control manager via the interface device;

generating, by the processor, a CAN communication message including a signal type of the switch and a message ID; and transmitting, by the processor, the CAN communication message to the autonomous vehicle.

15. The remote control method of claim 13, wherein the signal type of the switch is configured to include:

a first type in which an ON signal is outputted when the switch provided in the vehicle type is pressed once; and a second type in which the ON signal is outputted while the switch provided in the vehicle type is being pressed and an OFF signal is outputted when the switch is released.

16. The remote control method of claim 12, further comprising:

when the autonomous vehicle cannot be driven, notifying, by the processor, the interface device of a chassis control to switch operation recommendation.

* * * * *